United States Patent [19]

Crankshaw et al.

[11] E Re. 30,419

[45] Reissued * Oct. 21, 1980

[54] APPARATUS AND METHOD FOR TRANSMITTING ELEMENTS TO ARTICLES

[75] Inventors: Michael Crankshaw, Santa Fe Springs; Leo Kucheck, Irvine; Donald L. Caudill, Riverside, all of Calif.

[73] Assignee: Label-Aire Inc., Fullerton, Calif.

[ * ] Notice: The portion of the term of this patent subsequent to May 17, 1994, has been disclaimed.

[21] Appl. No.: 969,301

[22] Filed: Dec. 14, 1978

Related U.S. Patent Documents

Reissue of:

[64] Patent No.: 4,089,725
Issued: May 16, 1978
Appl. No.: 786,186
Filed: Apr. 11, 1977

U.S. Applications:

[63] Continuation-in-part of Ser. No. 699,264, Jun. 24, 1976, Pat. No. 4,024,011.

[51] Int. Cl.[2] ..... B32B 31/00

[52] U.S. Cl. ..... 156/249; 156/285; 156/299; 156/344; 156/361; 156/363; 156/542; 156/562; 156/566; 156/584; 156/DIG. 33; 156/DIG. 38; 221/73; 221/211; 271/98; 271/195; 271/197

[58] Field of Search ..... 156/249, 285, 299, 344, 156/361, 363, 542, 562, 566, 569, 584, DIG. 33, DIG. 38; 198/428, 459, 460; 221/73, 74, 211; 271/97, 98, 195, 197

[56] References Cited

U.S. PATENT DOCUMENTS

| | | | |
|---|---|---|---|
| 3,079,979 | 3/1963 | Flood | 156/542 |
| 4,024,011 | 5/1977 | Crankshaw | 156/299 |
| 4,046,613 | 9/1977 | Kucheck et al. | 156/249 |

FOREIGN PATENT DOCUMENTS 959804 6/1964 United Kingdom .

*Primary Examiner*—John T. Goolkasian
*Assistant Examiner*—Robert A. Dawson
*Attorney, Agent, or Firm*—Gordon L. Peterson

[57] ABSTRACT

Elements are supplied to a work station with the elements being arranged in a row. The elements are releasably retained at the work station. The articles to which the elements are to be transferred are moved through the work station with the row of elements at the work station extending in the same direction as the direction of article movement. Each of the elements is transferred to an associated article as the articles are moved through the work station. The elements are sequentially transferred with the most downstream element always being the next element to be transferred.

20 Claims, 9 Drawing Figures

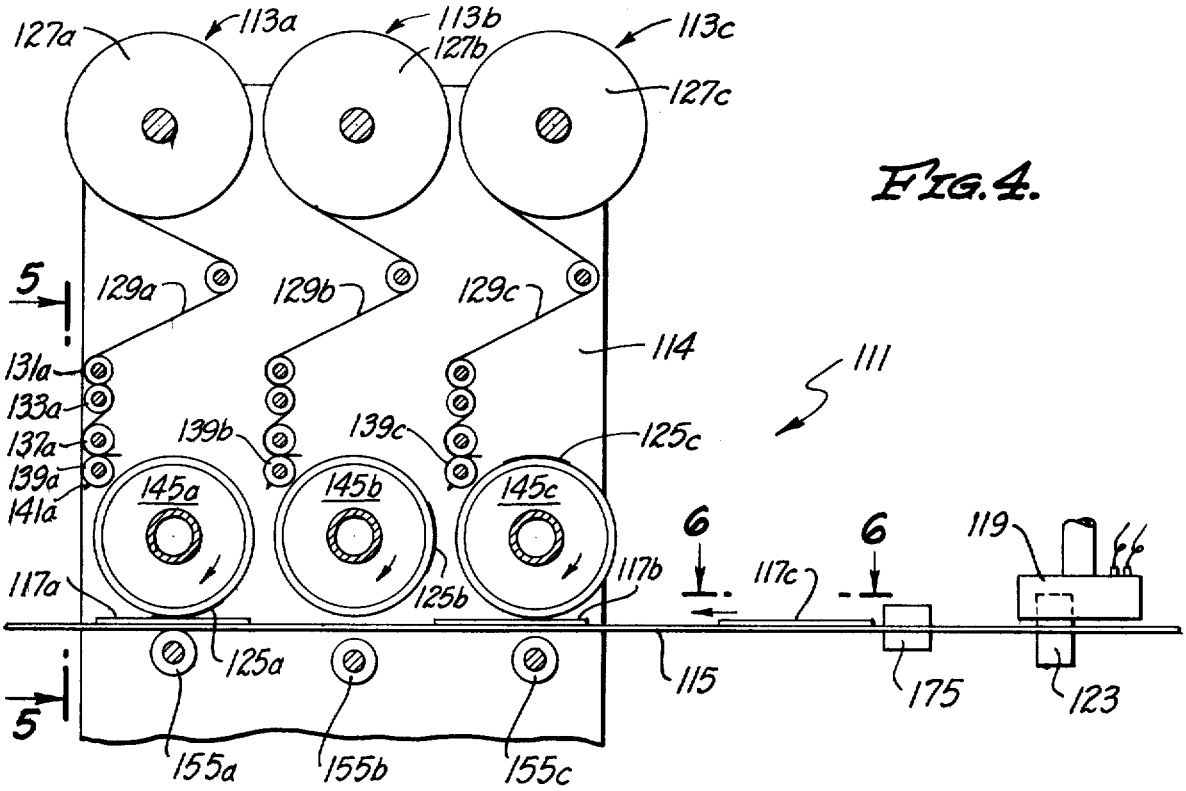
FIG. 4.
FIG. 5.
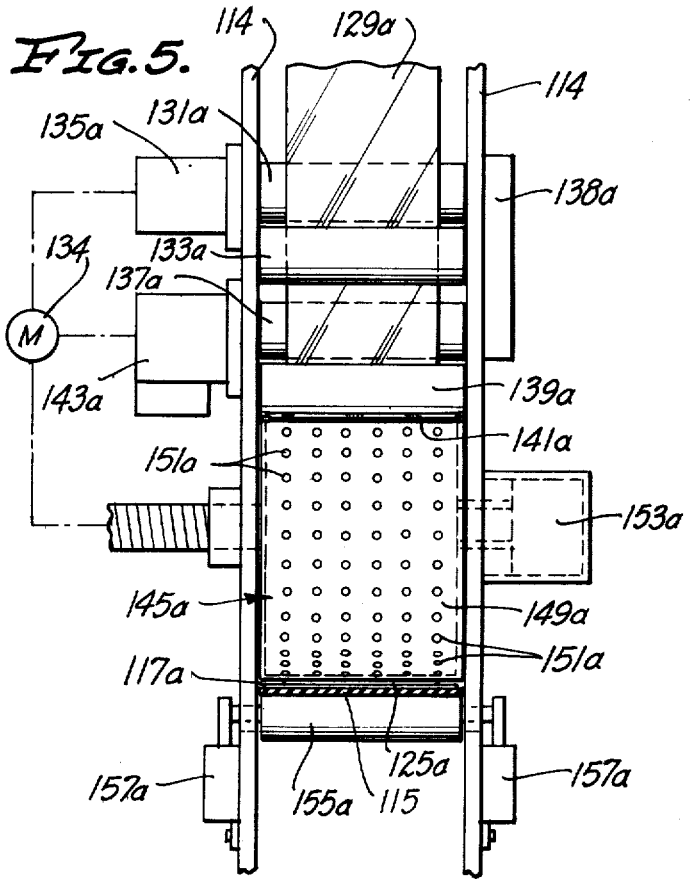
FIG. 6.
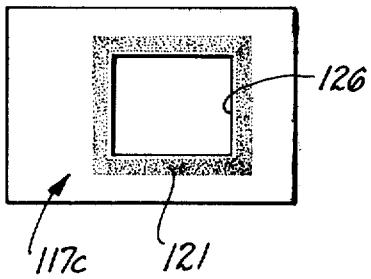

APPARATUS AND METHOD FOR TRANSMITTING ELEMENTS TO ARTICLES

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 699,264, filed June 24, 1976, now U.S. Pat. No. 4,024,011 and entitled LABEL APPLICATOR WITH REPETITIVE SEQUENTIAL FIRING ORDER AND METHOD.

BACKGROUND OF THE INVENTION

Label applicators apply labels to articles as the articles are conveyed past the label applicator. Typically, the labels are releasably adhered, in a single column, to an elongated backing strip. The label applicator removes one of the labels from the backing strip and releasably retains it at a labeling station. As the article to be labeled nears the removed label, it is applied to the article. Label applicators of this type are shown, for example, in U.S. Pat. Nos. 3,093,528 and 3,729,362.

Label applicators of this type, while satisfactory for many applications, can introduce delay into an assembly or packaging operation in which labeling must be carried out. For example, label indexing or advance; i.e., the removal of a label from the backing strip and applying it to a suitable retaining means, is relatively slow while the transfer of a retained label to the article can be rapidly carried out. Label indexing can be sufficiently slow so that the labeling function is caused to be the slowest operation on the production line.

Other work operations also involve the repetitive supply of elements to a work station so that such elements can be affixed, assembled, laminated, etc., to articles being conveyed through the work station. In some of the work operations, the repetitive supply of the element is the slowest step in the process, and accordingly, this limits the speed with which the articles can be conveyed through the work station. Thus, other work operations involve problems similar to the label application problem described above.

In the case of label application, it is known to use a wide backing strip and to provide two side-by-side columns of labels on the backing strip. In this event, two labels are simultaneously removed and releasably retained at the labeling station and the two labels are simultaneously transferred from the remaining means to either the same or different articles. However, in order that this prior art arrangement can be used to apply labels to different articles, it is necessary that article spacing bear a predetermined relationship to label spacing on the retaining means so that the articles and the labels are properly relatively positioned. This problem is so significant that this arrangement is basically unsuited for most label application jobs.

SUMMARY OF THE INVENTION

This invention materially speeds up operations which involve associating elements with articles. The invention is particularly applicable to those operations in which the repetitive supply of elements to a work station is the slowest portion of the operation.

This invention is applicable to an operation in which elements are repetitively supplied to a plurality of positions with the positions defining a row at a work station and with the axis of the row extending generally in a first direction. Retaining means releasably retains first and second of the elements at the first and second positions, respectively.

The articles are moved through the work station in the first direction with a first of the articles preceding a second of the articles. The first element is downstream, in the direction of article movement, of the second element. Transferring means is controlled by control means so that it transfers the first and second elements from the retaining means to the first and second articles, respectively, as the first and second articles are moved through the work station. In the preferred transferring order or firing order, the control means causes the transferring means to initiate the transfer of the first element to the first article before initiating the transfer of the second element to the second article. In other words, the elements are transferred sequentially, in a reverse firing order, with the most downstream element being the next element to be transferred. In a broader sense, however, the control means enables the transfer of the most downstream element and the actual transfer sequence is dependent upon various other factors, such as article spacing and the spacing between the positions of the elements.

The elements can be any member which is to be associated with an article. For example, the element may be any member which it is desired to affix to, deposit on or within, assemble with, laminate to, etc., the article. By way of example, the element may be a label or sheet which is to be adhered to the article; however, the invention is not limited to the use of sheet-like elements nor to adhesive attachment between the element and the article. Rather, the invention is primarily applicable to those work operations in which the repetitive supply of elements to the work station is carried out slower than is desired or is the slowest part of the work operation performed at the work station. The present invention is applicable wherever the transfer sequence of this invention is useful to increase speed of the operation being performed.

The supplying means which supplies the elements can be any device which is capable of intermittently supplying the elements to the positions at the work stations. The supplying means may supply a group of the elements simultaneously to the work station or it may supply the elements non-sequentially in accordance with any desired program.

For example, in the field of label application, the labels can be sheet fed or roll fed to the retaining means. If the labels are roll fed, they may be provided in two or more side-by-side columns on an elongated backing strip. This increases the number of labels per roll with the result that the downtime of the label applicator for the purpose of changing reels occurs much less frequently than with the above-described prior art label applicator.

If desired, the elements may be supplied in groups to the retaining means. This means that only one element supplying operation per N elements (where N is the number of elements supplied) is required, whereas in the prior art of label application, one label supplying operation per label was required. This time shares the relatively slow label supplying function with two or more label transfers with the result that the label application operation is materially speeded up.

The control means causes the elements to be transferred sequentially, rather than simultaneously, from the retaining means to the articles. For this reason, the spacing, if any, of the elements on the retaining means can be totally independent of article size and article spacing. For label application, this means that the narrowest possible backing strip capable of carrying the columns of labels in side-by-side relationship can be used. The paper used for the backing strip on a per label basis can be reduced because the labels in adjacent columns can be very close together; i.e., have only a very small area or margin of backing strip in between, whereas in a conventional single column of labels, the backing strip has margins extending on both sides of the single column of labels.

By always using the most downstream element as the next element to be applied, the articles have the greatest distance to travel during the time that elements are being supplied to the retaining means. Accordingly, even though the articles may be travelling at a high rate of speed, the relatively great distance which they must travel in order to be in position for the next firing sequence provides ample time for the relatively slow element supplying operation.

The element transfer operation can be controlled in various different ways, including the use of one or more article sensors. The elements may be retained and transferred in various different ways. For example, vacuum retention can be used to releasably retain the elements, and air pressure, mechanical means, etc., can be used to transfer the elements to the articles.

The invention can best be understood by reference to the following description taken in connection with the accompanying illustrative drawings.

BRIEF DESCRIPTION OF THE DRAWING

FIG. 4 is a somewhat schematic elevational view in section showing how the present invention can be applied to a laminating apparatus.

FIG. 5 is a view taken generally along line 5—5 of FIG. 4.

FIG. 6 is an enlarged plan view of one of the articles after adhesive has been applied to it.

DESCRIPTION OF THE PREFERRED EMBODIMENT

Figure 1:
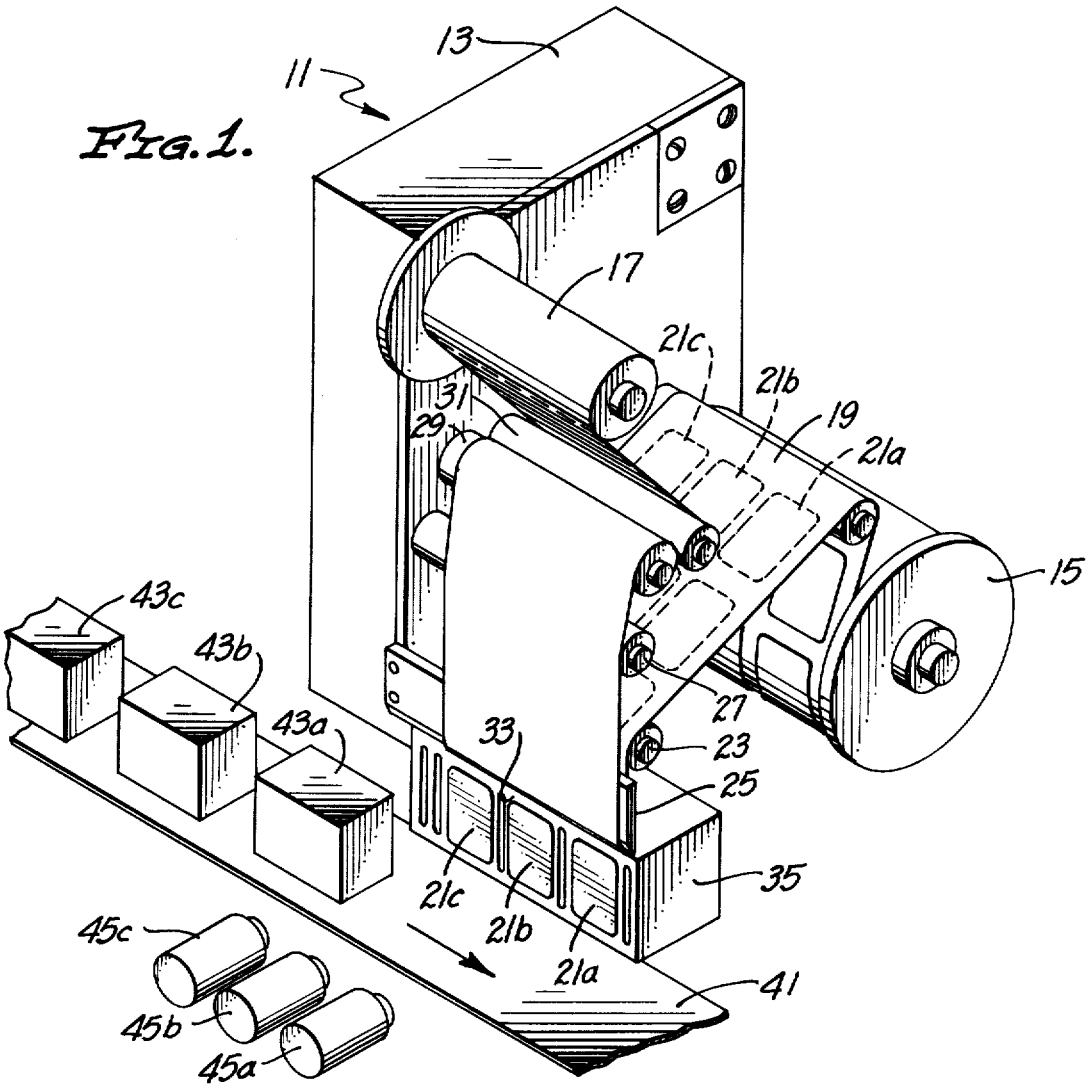
FIG. 1 is a perspective view showing one way in which the present invention can be applied to a label applicator.

FIG. 1 shows a label applicator 11 which includes a supporting structure 13 in the form of a housing, a supply reel 15 suitably rotatably mounted on the supporting structure, and a takeup reel 17 also rotatably mounted on the supporting structure. A relatively wide backing strip 19 of release paper or other suitable material is wound on the supply reel 15. Elements in the form of labels 21a, 21b, and 21c are arranged in three elongated side-by-side columns, respectively, on the backing strip 19. The labels 21a, 21b and 21c are adhesively secured to the backing strip 19.

The backing strip 19 extends over a guide roller 23, a peeling bar 25, a guide roller 27, and between a drive roller 29 and a cooperating pinch roller 31 to the take-up reel 17. The peeling bar 25 and the various rollers are all suitably mounted on the supporting structure 13. In the embodiment illustrated, the drive roller 29 is driven intermittently to move or index the backing strip 19 from the supply reel 15 across the peeling bar 25 to the take-up reel 17. The motor and controls for providing this intermittent movement of the backing strip 19 are not illustrated or further described herein inasmuch as they are well known to those skilled in the art.

Figure 2:
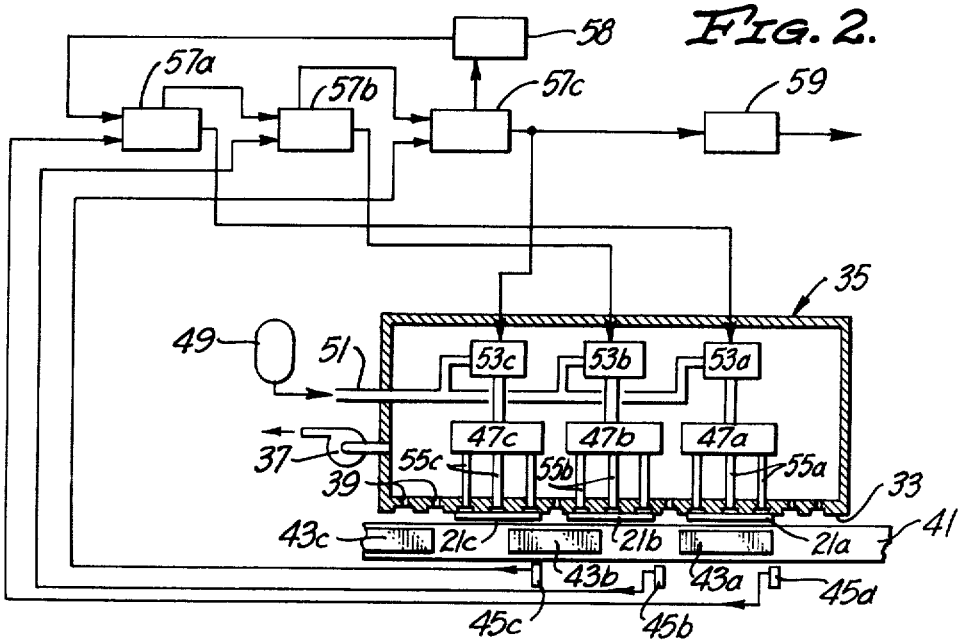
FIG. 2 is a schematic view showing by way of example how the labels can be retained in a row and then transferred to articles.

As the backing strip 19 moves across the peeling bar 25, three of the labels 21a, 21b, and 21c are removed from the backing strip and applied to an air pervious wall 33 at a work station, which in this embodiment, is a labeling station, with the adhesive side of the labels facing outwardly. The air pervious wall 33 forms one wall of a vacuum box 35 which is suitably mounted on the supporting structure 13. The interior of the vacuum box 35 is maintained at a pressure less than atmospheric in any suitable manner, such as by a vacuum pump 37 (FIG. 2) so the suction provided by the vacuum box 35 releasably retains the removed labels 21a, 21b, and 21c against the outer surface of the air pervious wall 33. The air pervious wall 33 may be of many different constructions so long as it is capable of applying suction to the removed labels, and in the embodiment illustrated, it includes a series of apertures 39 (FIG. 2).

The removed labels 21a, 21b, and 21c are arranged in a row on the air pervious wall 33. A conveyor 41 moves a plurality of articles, including the articles 43a, 43b, and 43c, in a first direction through the labeling station. The axis of the row of removed labels is parallel to the direction of movement of the articles, and the conveyor 41 moves the articles relatively close to the exposed adhesive side of the removed labels.

Sensors 45a, 45b, and 45c are responsive to the location of the articles 43a, 43b, and 43c, respectively, to provide control signals which bring about the transfer of the removed labels from the air pervious wall 33 to the associated articles. Although the label transfer function can be brought about in many different ways, in the embodiment illustrated, it is accomplished utilizing an air blast as shown in FIG. 2.

Three separate air manifolds 47a, 47b, and 47c are suitably mounted within the vacuum box 35. The air manifolds 47a, 47b, and 47c are supplied with compressed air from a suitable source, such as a storage tank 49 via a conduit 51 and solenoid valves 53a, 53b, and 53c. A series of flexible tubes 55a, 55b, and 55c convey compressed air from the air manifolds 47a, 47b, and 47c, respectively, to the apertures 39 in the pervious wall 33. For example, the flexible tubes 55a, 55b, and 55c may be arranged as shown in common Assignee's U.S. Pat. No. 3,885,705. As shown in FIG. 2, some of the apertures 39 do not receive any of the flexible tubes and are, therefore, available to transmit suction to retain the removed labels 21a, 21b, and 21c against the outer surface of the air pervious wall 33. This suction force can be overcome by an air blast from any one of the air manifolds 47a, 47b, and 47c to transfer the associated label from the air pervious wall 33. Accordingly, the label transferring sequence can be controlled by controlling the opening and closing of the solenoid valves 53a, 53b, and 53c.

The present invention provides for a transferring sequence in which the label which is farthest downstream in the direction of movement of the articles is the next label to be applied. This can be brought about in many different ways utilizing one or more sensors and various controls, and the arrangement shown in FIG. 2 is purely illustrative. Similarly, the means for applying labels to the labeling station, as well as the means for retaining the labels at the labeling station, are purely illustrative as these functions can be carried out by many different structures.

Figure 3:
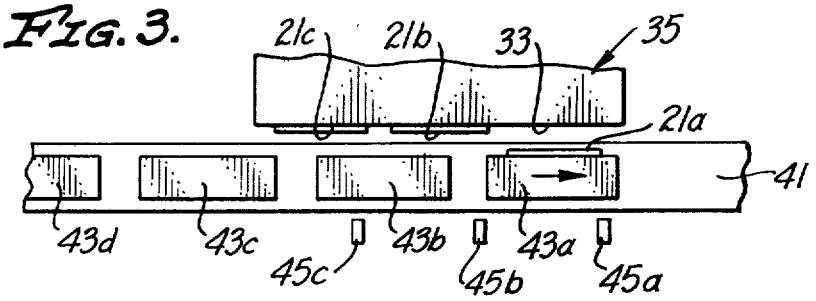
FIGS. 3-3b are partially schematic plan views showing how the firing sequence can be implemented.
Figure 3A:
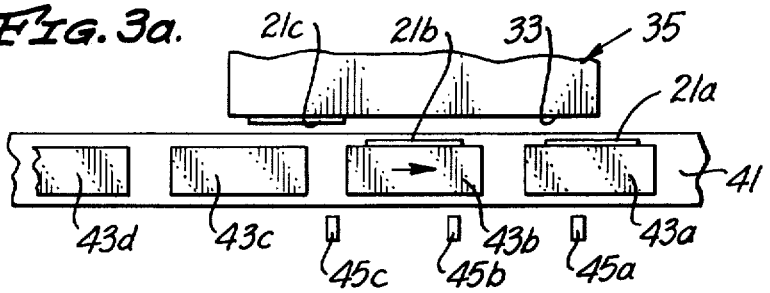
Figure 3B:
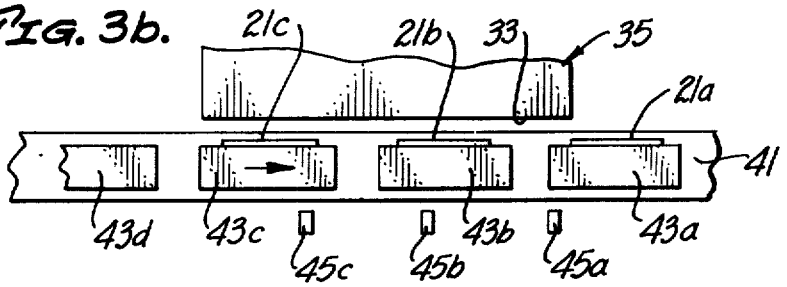

The reverse firing sequence is illustrated diagrammatically in FIGS. 3–3b. With the removed labels 21a, 21b, and 21c arranged in a row as shown in FIG. 1, they are ready for application to the associated articles. As the conveyor 41 moves the articles 43a, 43b, and 43c in the direction of the arrows in FIGS. 1 and 3–3b, the sensor 45a detects the presence of the article 43a and brings about, as described more fully hereinbelow, the opening of the valve 53a to provide an air blast from the air manifold 47a. The air blast from the air manifold 47a is sufficient to transfer the most downstream label; i.e., the label 21a, to the associated article 43a as shown in FIG. 3. As the conveyor 41 continues to move the articles, the sensor 45b detects the presence of the article 43b and brings about the opening of the solenoid valve 53b to transfer the most downstream label on the pervious wall 33; i.e., the label 21b to the article 43b as shown in FIG. 3a. Similarly, the sensor 45c brings about the transfer of the label 21c to the article 43c as shown in FIG. 3b.

With all of the removed labels transferred to associated articles, the backing strip 19 is again indexed to supply three other removed labels to the air pervious wall 33. It is important to note that an article 43d which is the next article to be labeled must travel from the position shown in FIG. 3b across nearly the full length of the air pervious wall 33 to the right end of the air pervious wall. During this relatively long travel time, the next group of labels is being removed from the backing strip 19 and fed to the air pervious wall 33. In the embodiment illustrated, the article 43d must travel several times farther during the indexing operation than it would travel in a conventional label applicating operation. This additional distance provides increased time for removing the second group of labels from the backing strip 19 and feeding the removed labels to the air pervious wall 33.

FIG. 2 shows one way of controlling the solenoid valves 53a, 53b, and 53c, it being understood that these valves may be controlled in many different ways. The controls include, in addition to the sensors 45a, 45b, and 45c, delay devices 57a, 57b, 57c, 58 and 59.

Each of the sensors 45a, 45b, and 45c may be any device, such as a microswitch or photocell, which is capable of detecting the presence of one of the articles. In the embodiment shown in FIG. 2, each of these sensors comprises a photocell, the light beam to which is broken by the presence of an article in front of the sensor.

Each of the delay devices 57a, 57b, and 57c is identical and may comprise an integrated circuit. Each of the delay devices 57a, 57b, and 57c has two input signals; i.e., an enable signal and a firing signal and one output signal with the output signal controlling the associated one of the solenoid valves 53a, 53b, and 53c.

For example, the delay device 57a receives input signals from the sensor 45a and from the delay device 57c with the latter signal being provided through the delay device 58 to enable the delay device 57a. Assuming that the delay device 57a is enabled, the firing signal provided by the sensor 45a, when the article 43a passes in front of this sensor to interrupt the light beam, will cause the delay device 57a to provide an output signal, which may occur after a predetermined short delay time, to the solenoid valve 53a to temporarily open the same to transfer the label 21a. The delay time is selected so that the label 21a will be applied to the desired location on the article 43a.

Immediately after the delay device 57a receives both its enable signal and its firing signal, it provides an enable signal to the delay device 57b to enable that delay device. Although the delay device 57b is enabled, it will respond only to a firing signal which is received after it is enabled and which is the result of the leading edge of the article 43b passing in front of the sensor 45b. In other words, if the signal provided by the sensor 45b is high when a space between articles confronts that sensor and low when an article confronts that sensor, the delay device 57b will respond only to a signal change from high to low which occurs after the delay device 57b is enabled. For this reason, the delay device 57b is not actuated even if the article 43a is in front of the sensor 45b when the delay device 57b receives its enable signal. Accordingly, when the sensor 45b senses the presence of the article 43b, the delay device 57b provides an output signal, after a predetermined short delay to the solenoid valve 53b to temporarily open the same and transfer the label 21b.

The delay device 57c is similarly enabled by an enable signal from the delay device 57b which is provided immediately after the delay device 57b receives both its enable signal from the delay device 57a and its firing signal from the sensor 45b. Accordingly, a signal from the sensor 45c resulting from the presence of the article 43c causes the latter to be labeled.

The delay device 57a is enabled by an enable signal from the delay device 57c which is provided immediately after the delay device receives both its enable signal from the delay device 57b and its firing signal from the sensor 45c. However, the enable signal to the delay device 57a is delayed by a suitable delay device 58. The delay interposed by the delay device 58 is of sufficient length to allow the article 43c to travel past the sensor 45a. This prevents the sensor 45a from sensing the articles 43b and 43c and causing a second label to be applied to them.

The delay devices may be either analog or digital and may be provided by those skilled in the art. For example, each of these delay devices may include a type D flip flop coupled to receive the enable signal to enable the delay device. An appropriate gate or gates, such as a NAND gate may be coupled to receive the output of the flip flop and the firing signal to provide a signal which can be used as the enable signal for the next delay device and which is suitably delayed, as by two one-shot generators to provide the output signal which is used to provide the air blast for label transfer purposes.

The output signal from the delay device 57c is also fed to the delay device 59 which provides, after a short delay period, an indexing signal to advance the backing strip 19 to provide a new group of labels on the air pervious wall 33. The delay provided by the delay device 59 is of sufficient length to assure that the label 21c has been transferred from the air pervious wall 33 before a new group of labels is supplied to the air pervious wall.

FIGS. 4–7 show by way of example how the concepts of this invention can be applied to a laminating apparatus 111. The laminating apparatus includes a plurality of identical laminating devices 113a, 113b, and 113c suitably mounted in any suitable manner, such as between mounting members 114 at a work station. Portions of the laminating devices 113b and 113c corresponding to portions of the laminating device 113a are designated by corresponding reference numerals with the letters b and c respectively substituted for the letter a. Two or more of the laminating devices 113a–113c may be provided, and the three illustrated are purely illustrative.

A conveyor 115 conveys articles 117a, 117b, and 117c through the work station. An adhesive applicator 119 of conventional construction is located upstream from the work station and applies an adhesive 121 (FIG. 6) in a tubular, rectangular pattern to each of the articles 117a–117c as such articles are brought beneath the adhesive applicator by the conveyor 115. For example, the applicator 119 may include nozzles (not shown) which shoot the adhesive onto the articles. The application of adhesive by the adhesive applicator 119 can be controlled in any suitable manner, such as by an article sensor 123 of conventional construction which provides a signal to the adhesive applicator 119 indicating the presence of one of the articles immediately below the applicator 119 in a position to receive the adhesive 121.

The laminating devices 113a–113c repetitively supply elements in the form of sheets or windows 125a, 125b, and 125c of a flexible transparent or translucent material to positions at the work station. These positions define a row at the work station, and the axis of the row extends in the direction of movement of the articles 117a–117c through the work station. The sheets 125a–125c are laminated to the articles 117a–117c in the same sequence as described above with reference to the embodiment of FIGS. 1–3, i.e., with the most downstream sheet always being the next sheet to be transferred.

In the embodiment of FIGS. 4–7, each of the articles 117a–117c has a cutout 126 (FIG. 6) around which the adhesive 121 is provided. For example, each of the articles may be a container or part of a container for a product with the window provided by the sheets 125a–125c permitting visual inspection of the contents. Alternatively, the articles 117a–117c and the sheets 125a–125c may be any two members which it is desired to laminate together.

The sheet 125a can be supplied to the work station and laminated to the article 117a in a variety of different ways, and the mechanism shown in FIGS. 4 and 5 is purely illustrative. The device 113a includes a reel 127a on which a strip or web 129a of flexible transparent film material is stored. The web 129a passes over a drive roller 131a, a pinch roller 133a, and a back-up roller 137a, all of which are drivingly coupled by gears 138a. The drive roller 133a is driven by a drive motor 134 through a web advance clutch and brake 135a. The web 129a next passes over a knife roller 139a which has a longitudinally extending blade 141a. The knife roller 139a is driven intermittently by the motor 134 and a one revolution clutch 143a, and each time the knife roller 139a is rotated, it cuts a length from the strip 129a in a known manner to form one of the sheets 125a. Feeding and cutting mechanisms of this type are known, and for this reason, the details thereof are not described in greater depth herein.

The device 113a also includes a rotatable drum 145a continuously driven by the motor 134 (FIG. 5). The drum 145a has a hollow interior and a peripheral wall 149a containing a large number of openings 151a. The interior of the drum 145a is partially evacuated in any conventional manner, such as by a vacuum pump 153a to create a suction at each of the openings 151a. Accordingly, when the sheet 125a is fed onto the peripheral wall 149a of the rotatable drum 145a the suction retains the sheet against the peripheral wall.

The rotation of the drum 145a carries the sheet 125a to a position immediately above the article 117a. The drum also releasably retains the sheet 125a. Accordingly, the drum 145a forms a part of the supplying means and it constitutes the means for releasably retaining the sheet at a position immediately above the conveyor 115.

The transfer of the sheet 125a to the article 117a is accomplished by the drum 145a and a nip roller 155a which underlies the conveyor and which is normally not in contact therewith. However, in order to accomplish the transfer and the resulting lamination, the nip roller 155a suitably mounted for vertical movement by linear actuators 157a so that it can be moved vertically toward and away from the drum 145a. By moving the nip roller 155a upwardly, the conveyor 115, the article 117a, and the sheet 125a are squeezed between the nip roller 155a and the drum 145a to thereby adhesively attach the sheet to the article.

The devices 113b and 113c are identical in construction and operation to the laminating device 113a. The devices 113a–113c may be controlled in much the same manner described above in the embodiment of FIGS. 1–3, except that the control of the knife rollers 139a–139c must be provided for. Also, it is desirable in this embodiment of the invention for the sheets 125a–125c to be supplied sequentially to their respective positions immediately above the conveyor 115 rather than simultaneously as was done with the labels 21a–21c.

Figure 7:
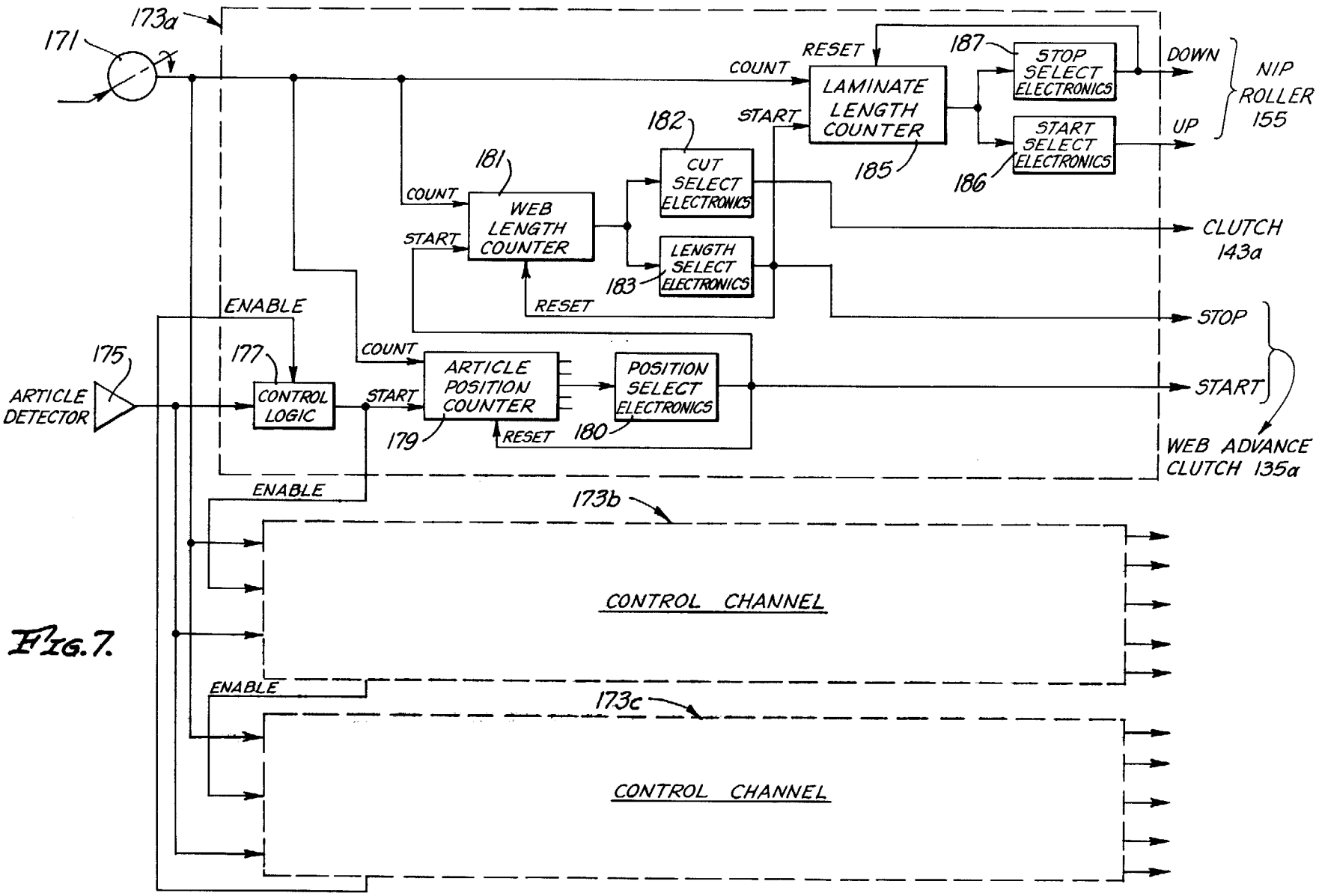
FIG. 7 is an electronic control schematic for the laminating apparatus.

The control functions for the laminating devices 113a–113c can be implemented in various different ways and one such way is shown in FIG. 7 which shows digital electronic controls for the laminating apparatus 111. The motor (not shown) which drives the conveyor 115 also drives a conveyor encoder 171 which may be an optical encoder or any other kind of device which provides a digital output signal comprising a plurality of pulses with the number of pulses representing conveyor displacement. The output signal from the encoder 171 constitutes one input to each of three identical control channels 173a, 173b, and 173c. One of the control channels is provided for each of the laminating devices 113a–113c. A second input to each of the control channels 173a–173c is provided by a single article detector 175 which may be a photocell or any other proximity device which provides the signal in response to one of the articles 117a–117c arriving at a predetermined position relative to the laminating devices 113a–113c. For example, the article detector 175 may be located between the device 113c and the applicator 119 as shown in FIG. 4.

The signal from the article detector 175 is transmitted to control logic 177. The control logic 177 is an electronic switch which is either enabled (closed) or not enabled (open). Assuming that the control logic 177 is enabled in the manner described below by an enable signal from the control channel 173c, it transmits the signal from the article detector 175 to the start input of an article position counter 179. The signal from the control logic 177 is also transmitted to the enable input of the control channel 173b to enable that channel so that it will be operative for the next article sensed by the article detector 175. The count input of the article position counter 179 is coupled to the encoder 171 so that the pulses provided by the encoder can be counted after the start signal is obtained.

The counter 179 counts the pulses from the encoder 171 and provides as its output a binary number indicating the present value of such count. Accordingly, the counter output signal corresponds to a predetermined position of the article 117a. Position select electronics 180 monitors the output signal of the counter 179 and is responsive to the counter reaching a predetermined count for providing a start signal to the web advance clutch 135a. The same signal is also used to reset the counter 179. The start signal causes the clutch 135a to engage so that the web 129a is advanced. The count to which the position select electronics 180 responds can be adjusted so that the start signal to the web advance clutch 135a can be provided at the desired position of the article 117a. The position select electronics 180 may be any conventional circuitry which can read the binary number output of the counter 179 and provide a signal in response to a particular binary number input.

The signal from the position select electronics 180 is also provided to the start input of a web length counter 181. The counter 181 then counts the pulses from the encoder 171 and provides as its output a binary number reflecting such count. Cut select electronics 182 responds to a first binary number from the counter 181 to provide a signal to the one revolution clutch 143a, whereupon the clutch 143a rotates the knife roller 139a through one revolution to cut the sheet 125a from the web 129a. Length select electronics 183 is responsive to a second higher count of the counter 181 to provide a stop signal to the clutch 135a, whereupon this clutch disengages and the feeding of the web 129a ceases immediately. A brake may be used in conjunction with the clutch 135a to assure that the web advance terminates immediately upon disengagement of the clutch.

The length select electronics 183 assures that the web advance will not terminate prior to the cutting operation. The signal from the length select electronics 183 is also fed back to the counter 181 to reset the counter and is fed to the start input of a laminate length counter 185. This enables the laminate length counter 185 to count the pulses from the encoder 171 and to provide as its output a binary number indicating the number of such pulses. Start select electronics 186 is responsive to a first binary number output from the counter 185 to provide an up signal to the actuators 157a. This causes the actuators 157a to extend to move the nip roller 155a up so as to squeeze the conveyor 115, the article 117a, and the sheet 125a between the drum 145a and the nip roller 155a. The tangential velocity of the drum 145a is preferably equal to the speed of the conveyor 115 so that the lamination can be smoothly accomplished. Stop select electronics 187 responds to a second higher binary number output of the counter 185 to provide a signal to the actuators 157a to move the nip roller 155a down to a position in which it does not engage the conveyor 115. The signal from the stop select electronics 187 is also used to reset the counter 185.

It should be noted that the control channel 173b is enabled immediately following the receipt by the control channel 173a of its signal from the article detector 175. Accordingly, regardless of when the article 117b may be conveyed to the work station, the control channel 173b will be able to control the laminating device 113b in the same manner described above for the control channel 173a. Thus, the control system shown in FIG. 5 will control the laminating devices 113a–113c even though spacing of the articles 117a–117c on the conveyor 115 may be unequal and even though the conveyor speed may not be completely constant. This is accomplished by only a single article detector and by the conveyor encoder which is used, in effect, to track the position of each of the articles 117a–117c through the work station.

As in the embodiment of FIGS. 1–3, the articles 117a–117c are moved in a sequence or series through the work station with the article 117b being intermediate, and next in the series to, the articles 117a and 117c. Only one of the elements 125a–125c is applied to each of the articles. In other words, only one of the devices 113a–113c is selected by the control means to apply an element to a selected article. The same is also true of the embodiment of FIGS. 1–3.

Although an exemplary embodiment of the invention has been shown and described, many changes, modifications and substitutions may be made by one having ordinary skill in the art without necessarily departing from the spirit and scope of this invention.

We claim:

1. An apparatus for transferring elements to articles which are moved in a first direction through a station, said apparatus comprising:

means for releasably retaining first and second of the elements at first and second positions with said positions defining a row at said station, the axis of the row extending generally in said first direction and the first position being downstream, in the direction of article movement, of said second position;

means for transferring the first and second elements from the retaining means to first and second of the articles, respectively, as the first and second articles are moved through said station; and control means for controlling said transferring means so that said transferring means initiates transfer of the first element to the first article before initiating transfer of the second element to the second article.

2. An apparatus as defined in claim 1 including supplying means for supplying the elements in groups to the retaining means, a first of said group of elements includes said first and second elements, and means for controlling said supplying means so that said supplying means supplies a second group of elements to the retaining means after the last element of said first group is transferred from the retaining means whereby the articles can be moved in said first direction for at least a portion of the time during which the second group of elements is being supplied to the retaining means.

3. An apparatus as defined in claim 1 wherein said control means includes sensor means responsive to the location of at least one of said first and second articles for providing a control signal and means responsive to said control signal for initiating the transfer of at least one of said first and second elements.

4. An apparatus as defined in claim 1 wherein said row includes N positions wherein N is a number greater than 2, said N positions including said first and second positions, said transferring means transfers N elements from the N positions to N articles, respectively, as each of such N articles moves through said station and said control means controls said transferring means so that said transferring means sequentially initiates the transfer of the elements from the N positions to the N articles, respectively, in a firing order which begins with the element at the position which is most downstream, in the direction of article movement, and which progresses upstream to the element at the most upstream position.

5. An apparatus for transferring elements to articles which are moved in sequence first to a second station and then to a first station, said apparatus comprising:

means for releasably retaining first and second of the elements at the first and second stations, respectively;

means for transferring the first and second elements from the retaining means to the first and second articles, respectively, as the first and second articles are moved through the first and second stations, respectively; and control means for controlling said transferring means so that said transferring means initiates transfer of the first element to the first article before initiating transfer of the second element to the second article.

6. An apparatus for transferring elements to articles which are moved in a first direction through a work station, said apparatus comprising:

means for repetitively supplying elements to a plurality of positions, said positions defining a row at said work station with the axis of the row extending generally in said first direction and with a first of the positions being downstream, in the direction of article movement, of a second of said positions;

means for releasably retaining first and second of the elements at said first and second positions, respectively;

means for transferring the first and second elements from the retaining means to first and second of the articles, respectively, as the first and second articles are moved through said station; and control means for controlling said transferring means so that said transferring means initiates transfer of the first element to the first article before initiating tranfer of the second element to the second article.

7. An apparatus as defined in claim 6 wherein said supplying means supplies elements to said first and second positions nonsimultaneously.

8. An apparatus as defined in claim 6 wherein said control means includes an article sensor for providing a signal when an article reaches a predetermined location and means for tracking the position of such article so that the transferring means causes one of the elements to be transferred to such article regardless of any changes in velocity of such article in moving through the work station.

9. An apparatus as defined in claim 6 wherein said element includes a flexible sheet, said supplying means includes a drum and means for feeding said sheet to the drum, said releasable retaining means including means for applying a pressure differential to the sheet on the drum to releasably retain the sheet on the drum.

10. An apparatus as defined in claim 9 wherein at least one of the sheet and the article to which it is to be transferred includes an adhesive and said transferring means includes means cooperable with said drum to press said sheet against the corresponding article to adhere the sheet to such article.

11. A method of transferring elements to articles *wherein at least some of the articles have unequal spacing* comprising:

repetitively supplying elements to a plurality of positions with such positions being arranged in a sequence which defines a row at a working station and with a first of said positions being next in said sequence to a second of said positions, first and second of said elements being supplied to said first and second positions, respectively;

releasably retaining the elements supplied to said positions, respectively;

advancing a plurality of articles *at least some of which are unequally spaced*, including first and second articles in a sequence, through said work station generally from one end of said row to the other end of said row with said first article being next in the sequence of articles to the second article and with the first article leading the second article, said other end of said row being closer to said first position than to said second position; and transferring the first and second elements from the first and second positions to said first and second articles, respectively, as the articles are advanced through the work station and preventing the transfer of elements from the first and second positions to the second and first articles, respectively, as the articles are advanced through the work station.

12. A method as defined in claim 11 wherein said step of transferring includes adhesively attaching the first element to the first article.

13. A method as defined in claim 11 wherein said step of supplying includes providing an elongated strip of flexible material and a drum, cutting a length from said strip to form one of said elements, applying said one element to the drum, applying suction to the interior of the drum to releasably retain said one element on the drum, and rotating the drum to move said one element to one of said positions.

14. A method as defined in claim 13 including applying adhesive to one of the articles, and said step of transferring includes holding the adhesive on said one article against said one element on the drum to adhesively join such sheet to said one article.

15. An apparatus for transferring elements to articles [which] *regardless of the spacing between articles wherein the articles* are moved in a series in a first direction through a work station *and* wherein a first of the articles is next in the series of articles to a second of the articles and [with] the first article [leading] *leads* the second article, said apparatus comprising:

first means for supplying elements and transferring the elements to articles at a first location;

second means for supplying elements and transferring the elements to articles at a second location *which is upstream in the direction of article movement from the first location*; and control means [for] *responsive to the position of at least one of the first and second articles for* causing the first means to transfer at least one of the elements to the first article at the first location and for causing the second means to transfer at least another of the elements to the second article at the second location *regardless of the spacing between the first and second articles*, said control means preventing the transfer of elements to the first and second articles at the second and first locations, respectively.

16. An apparatus as defined in claim 15 wherein said control means enables said first and second means in a repetitive sequence in which first one and then another of said first and second means are enabled for operation.

17. An apparatus as defined in claim 15 wherein said control means is responsive to the location of the first article to cause the first means to transfer at least said one of the elements to said first article and to cause said second means to be enabled so that it is made ready to transfer at least said another element to the second article.

*18. A method of transferring elements to articles comprising:*

*repetitively supplying elements to a plurality of positions with such positions being arranged in a sequence which defines a row at a work station and with a first of said positions being next in said sequence to a second of said positions, first and second of said elements being supplied to said first and second positions, respectively;*

*with said first and second elements releasably retained at the first and second positions, respectively, advancing a plurality of articles, including first and second articles in a sequence, through said work station generally from one end of said row to the other end of said row with said first article being next in the sequence of articles to the second article and with the first article leading the second article, said other end of said row being closer to said first position than to said second position;*

*said step of advancing including advancing said first article past said second element at said second position; and*

*transferring the first and second elements from the first and second positions to said first and second articles, respectively, as the articles are advanced through the work station and preventing the transfer of elements from the first and second positions to the second and first articles, respectively, as the articles are advanced through the work station.*

*19. An apparatus for transferring elements to articles which are moved in a first direction through a station wherein a first of the articles leads a second of the articles through the station, said apparatus comprising:*

*means for releasably retaining first and second of the elements at first and second positions with said positions defining a row at said station, the axis of the row extending generally in said first direction and the first position being downstream, in the direction of article movement, of said second position;*

*sensor means responsive to the location of at least one of the first and second articles for providing a control signal;*

*means for transferring the elements from the retaining means to the articles as the articles are moved through said station; and*

*control means responsive to said control signal for controlling said transferring means so that said transferring means transfers the first element to the first article and the second element to the second article, said control means preventing the transfer of elements to the first and second articles at the second and first positions, respectively.*

*20. A method as defined in claim 18 wherein the spacing between the first and second positions is independent of the spacing between the first and second articles.*

* * * * *